United States Patent
Belke (10) Patent No.: US 12,083,531 B2
(45) Date of Patent: Sep. 10, 2024

(54) DRIVE MECHANISM FOR A CRUSHER

(71) Applicant: Jeffrey Victor Belke, Mount Pleasant (AU)

(72) Inventor: Jeffrey Victor Belke, Mount Pleasant (AU)

( * ) Notice: Subject to any disclaimer, the term of this patent is extended or adjusted under 35 U.S.C. 154(b) by 239 days.

(21) Appl. No.: 17/916,145

(22) PCT Filed: Mar. 31, 2021

(86) PCT No.: PCT/AU2021/050294
§ 371 (c)(1),
(2) Date: Sep. 30, 2022

(87) PCT Pub. No.: WO2021/203161
PCT Pub. Date: Oct. 14, 2021

(65) Prior Publication Data
US 2023/0173499 A1      Jun. 8, 2023

(30) Foreign Application Priority Data
Apr. 8, 2020   (AU) .............................. 2020901118

(51) Int. Cl.
B02C 2/04          (2006.01)
(52) U.S. Cl.
CPC .................... B02C 2/047 (2013.01)
(58) Field of Classification Search
CPC ............. B02C 2/02; B02C 2/04; B02C 2/047
See application file for complete search history.

(56) References Cited

U.S. PATENT DOCUMENTS

| | | | | |
|---|---|---|---|---|
| 835,286 A | * | 11/1906 | Menier | ..................... B02C 2/04 |
| | | | | 241/207 |
| 3,666,188 A | * | 5/1972 | Lippmann | ................. B02C 2/06 |
| | | | | 241/213 |

FOREIGN PATENT DOCUMENTS

| | | |
|---|---|---|
| CN | 107457028 A | 12/2017 |
| SU | 886971 A1 | 12/1981 |

OTHER PUBLICATIONS

Extended European Search Report for application No. 21784572.6-1015/4132712 PCT/AU2021050294, dated May 8, 2024, 6 pages.

* cited by examiner

*Primary Examiner* — Bobby Yeonjin Kim
(74) *Attorney, Agent, or Firm* — BainwoodHuang (57) ABSTRACT

There is disclosed a crusher for crushing material into finer particulates. The crusher includes a housing enclosing a cone assembly comprising a crushing head mounted on a shaft. The housing supports an outer crushing shell, while the crushing head supports an inner crushing shell. The two crushing shells cooperate to form a crushing gap therebetween. A cam is provided on the shaft with the cam being located remote from the crushing head. A number of drive units extend between the cam and the housing, wherein each drive unit has a first end movably abutting the cam and a second end movably abutting a discrete spherically domed reaction seat provided on the housing. Each drive unit is a telescopic body with a bore extending therethrough so that hydraulic fluid injected into each bore applies a drive force onto the cam and the reaction seat to cause movement of the crushing head.

24 Claims, 6 Drawing Sheets

DRIVE MECHANISM FOR A CRUSHER

TECHNICAL FIELD

The present disclosure relates to a drive mechanism for a crusher.

More particularly, the present disclosure relates to a hydraulic drive mechanism with telescopic drive units arranged radially around a shaft of the crusher.

BACKGROUND

Crushers, such as cone crushers and gyratory crushers, are used to crush ore or large rocks into smaller rocks, gravel or dust. The crushers can also be used for recycling waste material such as for crushing plastics material into finer particulates. Typically, a crusher has a housing supporting an outer crushing shell and in which is located a crushing head supporting an inner crushing shell. The crushing head is moved to crush the feed ore between the outer crushing shell and the inner crushing shell. The desired size of the finer particulate matter is regulated by setting the minimum width of a crushing gap formed between the outer and inner crushing shells.

One type of cone crusher utilises an eccentric member to cause movement of the crushing head. The shaft of the crushing head is mounted in the eccentric member and, during use, the eccentric member causes the shaft to move along a predefined path to cause movement of the crushing head. Prior art examples of such eccentric drives can be seen in U.S. Pat. Nos. 5,115,991 and 5,718,391. Similarly, in WO 2005/094996 there is disclosed a cone crusher having a hydraulically operated radial piston-type drive train (26, 27) that is housed within its crushing head (13) and that is coupled to an eccentric (31).

One problem encountered in crushers utilising such an eccentric member is that it is cumbersome to change the predefined path of movement of the shaft-normally this requires the cone crusher to be dismantled so that the eccentric member can be exchanged for another. It is often also difficult to adjust the minimum size of the crushing gap between the housing and the crushing head because the eccentric does not allow the "throw" of the crushing head to be altered.

In another type of cone crusher the crushing head rests in a spherical bearing and its shaft is held in a cylindrical sleeve having an unbalanced mass attached thereto. By rotating the cylindrical sleeve, the unbalanced mass is rotated and this causes it to swing radially outwardly due to centrifugal forces acting on the sleeve-which in turn causes the crushing head to gyrate within the spherical bearing. The gyration path (and the crushing gap) can be selectively changed by either altering the speed of rotation of the sleeve, by altering the mass of the unbalanced mass, or by changing the distance between the unbalanced mass and the sleeve. Prior art examples of such unbalanced mass drives can be seen in U.S. Pat. Nos. 8,872,105 and 8,962,577. One problem that may be encountered in using an unbalanced mass is that the rotational movement of the mass causes excessive vibrations in the cone crusher leading in increased wearing of its parts.

CN 207102723 also discloses a gyratory (inertia) cone crusher equivalent to the above but being further provided with a cavity protection device. Its drive mechanism includes a pulley that drives a transmission shaft so that torque is transmitted to the main shaft of the crushing head, thereby to cause rotation of the unbalanced mass to generate the breaking force. The cavity protection device is in the form of shock absorbers (15) located around the crushing head and configured to prevent the crushing head from directly contacting the crushing shell should the movement of the crushing head become too extreme. It is described that the shock absorbers are preferably elastic rubber air springs, but they can also be hydraulic cylinders. However, these hydraulic cylinders do not impart driving force to the crushing head as any such force would conflict with the breaking force generated by the unbalanced mass.

DE 1157459 discloses a hydraulic drive for a crusher. The hydraulic drive is located within the crusher head and accordingly the drive force exerted must directly lift the entire mass of the crusher head. Furthermore, the hydraulic drive comprises a number of hydraulic lifting units having piston-cylinder units with curved end surfaces that slide along a pressure ring mounted on the crushing head. There thus tends to be excessive frictional wearing between the end surfaces of the pistons and the pressure ring because the sealed ends of the pistons are not lubricated and will tend to become coated in dust from the material being crushed. Also, it will be appreciated that as the crushing head is lifted farther, an increasingly larger part of the lifting force vector applied by the pistons is lost due to the pistons no longer acting orthogonally onto the pressure ring.

The above references to the background art and any prior art citations do not constitute an admission that the art forms part of the common general knowledge of a person of ordinary skill in the art.

SUMMARY OF THE DISCLOSURE

According to a first aspect of the disclosure, there is provided a crusher for crushing material into finer particulates, the crusher comprising a housing supporting an outer crushing shell;
a cone assembly located within the housing and being supported on a bearing, the cone assembly comprising
a crushing head supporting an inner crushing shell that cooperates with the outer crushing shell to form a crushing gap therebetween; and
a shaft joined to the crushing head, the shaft having a cam that is located remote from the crushing head; and
a drive mechanism being configured to cause movement of the cone assembly, the drive mechanism comprising a number of drive units extending between the cam and the housing, wherein each drive unit has a first end movably abutting the cam and a second end movably abutting a discrete reaction seat provided on the housing
wherein, during use, the drive units are selectively activated to impart a drive force onto the cam to cause movement of the crushing head.

Each drive unit may comprise a telescopic body having a bore extending therethrough, the bore having opposed open ends and being configured to receive and exhaust a variable volume of hydraulic fluid. During use, the hydraulic fluid in the bore is configured to contact directly against and apply a force directly onto the cam and the reaction seat.

The cam may be integrally formed with the shaft and have a spherically domed convex surface. The cam may be configured to move in three-dimensions within the housing during use, the movement being confined to a path being concentrically complementary to a shape of the bearing.

The bearing may be spherically concave. In one embodiment the bearing slidably supports the crushing head while the shaft extends through a hole in the bearing. In another embodiment the bearing slidably supports a foot of the shaft.

Each drive unit may comprise two or more cylinders being provided in a substantially sealed sliding engagement within each other. The crusher may further have a biasing member being configured to bias the cylinders to extend longitudinally apart from each other. The first end of each drive unit may be in sliding contact with the cam and the second end of each drive unit is in sliding contact with its associated reaction seat so that neither the first end nor the second end of the drive unit is mechanically coupled to either the cam or the reaction seats.

Each drive unit may be configured to slide over the cam and its reaction seat to permit changes in the angular orientation of the drive unit within the housing so that the drive unit remains longitudinally aligned between the cam and its reaction seat. The cam and each reaction seat may have spherical centres whereby, during use, each drive unit remains longitudinally aligned between the spherical centres of the cam and its reaction seat. Being so aligned maximises the force imparted by the drive units onto the cam because the force vector remains orthogonal to the cam and reaction seat.

Each drive unit may have a seal provided at the opposing first and second ends of the drive unit, each seal defining a concave outer face being configured to abut against complementary convex outer faces of the cam and the reaction seat respectively. Each seal may have an annular inner leg and a concentric outer leg that are spaced apart from each other by a groove.

In one embodiment the inner leg defines a continuous annular fluid sealing face being configured to form a hydraulic pressure seal between the drive unit and the cam or reaction seat respectively. The seal may be configured to discharge a portion of the hydraulic fluid beyond the inner leg during use to apply a lubricating film on the cam or reaction seat respectively.

In one embodiment the outer leg defines an annular locating face being configured to slidingly locate the seal against the cam or reaction seat respectively. The locating face may be interrupted by one or more slots traversing the outer leg. The outer leg may have an outer radius that is maximized to allow the seals to cover an as large as possible spherical dome of the cam or reaction seat but which outer radius is sufficiently restricted to avoid contact with any other drive unit's seal during use.

The reaction seats may be located operatively above the cam so that the drive units are angled downwardly within the housing.

According to a second aspect of the disclosure, there is provided a method of operating a crusher having a housing supporting an outer crushing shell and further having a cone assembly located within the housing, the cone assembly comprising a crushing head being mounted on a shaft, the method comprising the steps of:
    providing a cam on the shaft;
    providing a drive mechanism comprising a number of drive units extending between the cam and the housing, wherein each drive unit comprises a telescopic body with a bore extending therethrough, the telescopic body having a first end abutting the cam and a second end abutting a discrete reaction seat provided on the housing; and
    selectively injecting and exhausting a variable volume of hydraulic fluid into the bore of each drive unit, whereby, when increasing the volume of the hydraulic fluid in each bore, the hydraulic fluid imparts a drive force directly onto the cam and the reaction seat to cause movement of the crushing head.

According to a third aspect of the disclosure, there is provided a seal for location between a tubular member and a spherical cam, the seal being configured to allow fluid contained within a bore of the tubular body to contact the cam, the seal further being configured to allow a portion of the fluid to be discharged from the bore between the seal and the cam, the seal comprising
    a body being configured to be joined to the tubular member, the body having an opening therethrough being adapted to bring the bore into fluid communication with the cam;
    an inner leg extending from the body and defining a continuous annular fluid sealing edge for engagement against the cam;
    an outer leg extending from the body, the outer leg concentrically surrounding the inner leg and being separated therefrom by an annular groove, the outer leg defining a locating edge being adapted to slidingly abut against the cam; and
    at least one slot traversing the outer leg and interrupting the locating edge,
    whereby, during use, fluid pressure in the bore is configured to the lift the fluid sealing edge of the inner leg away from the cam to discharge a portion of the fluid from the bore without substantially lifting the locating edge of the outer leg away from the cam.

The seal may be used on a drive unit of a crusher as defined in the first aspect of the disclosure.

BRIEF DESCRIPTION OF DRAWINGS

The above and other features will become more apparent from the following description with reference to the accompanying schematic drawings. In the drawings, which are given for purpose of illustration only and are not intended to be in any way limiting.

DETAILED DESCRIPTION

The present disclosure relates to a crusher that is used for crushing solid material, such as ore, and more particularly to a drive mechanism for such a crusher. The crusher will typically be a cone crusher or a gyratory crusher.

Figure 1:
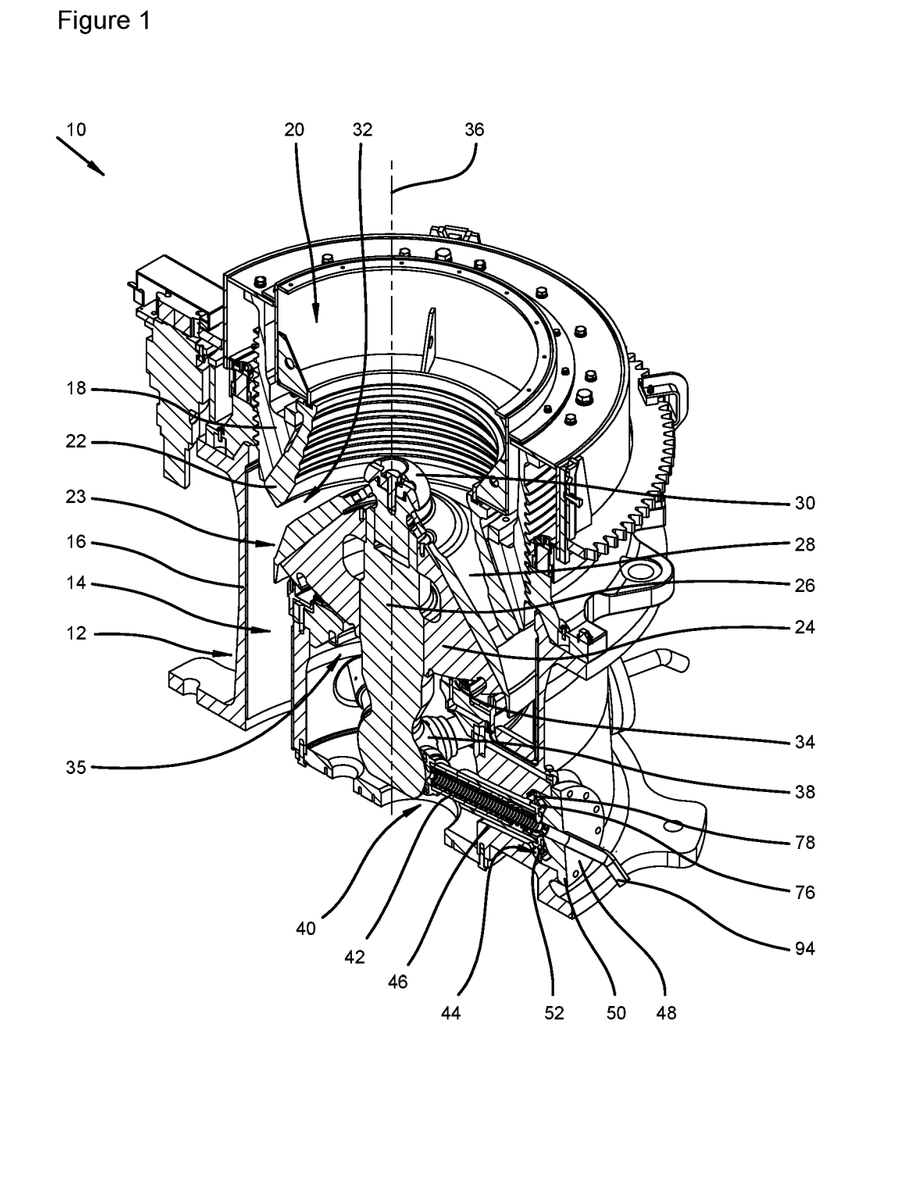
FIG. 1 is a sectional perspective view of a first embodiment of a cone crusher.
Figure 2:
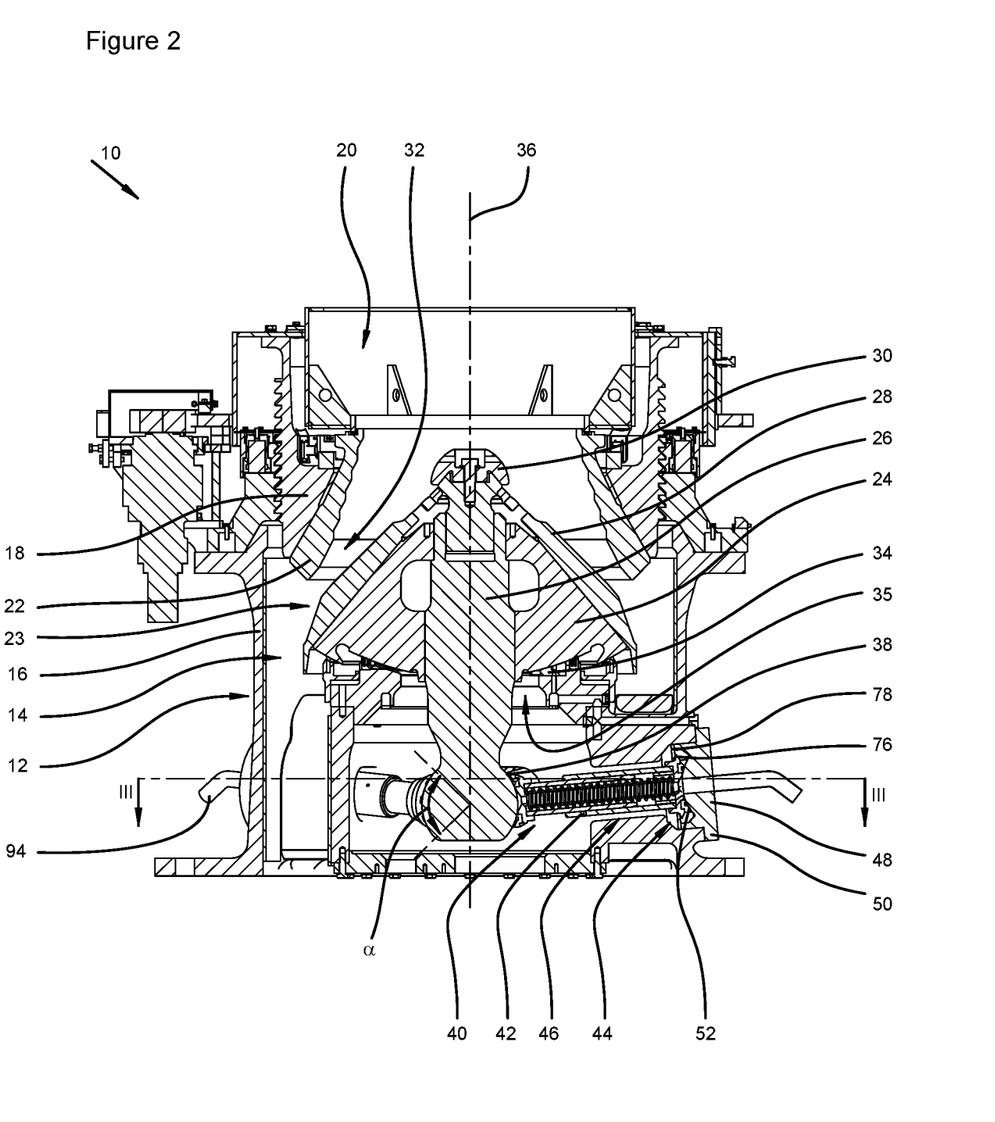
FIG. 2 is a sectional side view of the crusher shown in FIG. 1.
Figure 3:
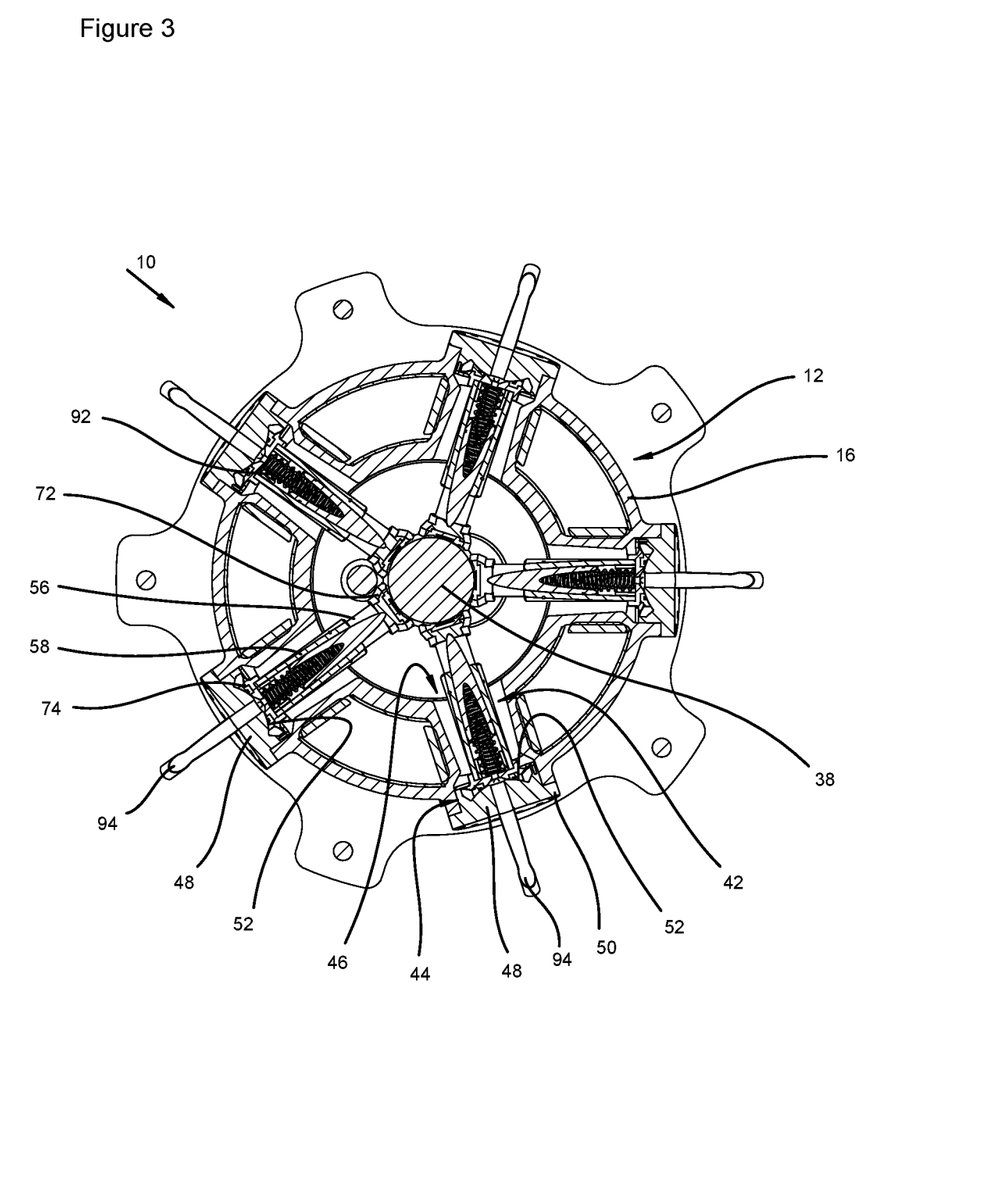
FIG. 3 is a sectional top view seen along arrows III-III in FIG. 2, with a shaft of the crusher centrally located in its neutral rest position.

Referring to FIGS. 1 and 2 of the drawings there is shown a first embodiment of a cone crusher 10 which is used, for example, for crushing coarse ore into finer particle size ore. The crusher 10 comprises a housing 12 defining a chamber 14 for containing various operational parts of the crusher 10. The housing 12 includes a lower bowl frame structure 16 that is closed at its upper end by a removable lid structure 18. A frusto-conical top opening 20 extends through the lid structure 18, through which top opening 20 feed ore can pass into the chamber 14.

A frusto-conical outer crushing shell 22 (also known in the art as a bowl liner) is supported by the lid structure 18 to line the top opening 20.

A cone assembly 23 is located inside the chamber 14, which cone assembly 23 comprises a crushing head 24 being mounted on a shaft 26. In this embodiment the top of the shaft 26 terminates at or near to the top of the crushing head 24. The crushing head 24 has an upper part that is conical in shape and extends at least partially into and/or through the top opening 20. The crushing head 24 supports an inner crushing shell 28 (also known in the art as a mantle) that is secured in place by a cap 30 being joined to the shaft 26. Alternatively, the inner crushing shell 28 can be secured to the crushing head 24 by any other conventional methods. Yet further, in some embodiments the inner crushing shell 28 can be integrally formed as part of the crushing head 24.

The space between the outer crushing shell 22 and the inner crushing shell 28 defines a crushing gap 32. Due to the outer crushing shell 22 having a narrower cone angle than that of the inner crushing shell 28, the crushing gap 32 is wider near the outer side of the lid structure 18 and narrower near the inner side of the lid structure 18, i.e. the crushing gap 32 is wider near the conical tip of the crushing head 24 and narrows towards the base of the crushing head 24.

Both the outer crushing shell 22 and the inner crushing shell 28 are wear items and are configured to be replaced when needed. The position of lid structure 18 and/or the crushing head 24 are able to be adjusted, whereby lid structure 18 can be moved closer to or further from the crushing head 24 to provide one method of adjusting the size of the crushing gap 32.

The crushing head 24 is movably supported within the chamber 14 on a spherical support or bearing 34 forming part of the frame structure 16. The bearing 34 is spherically concave in cross-section (this can be more clearly seen in FIG. 2) while the crushing head 24 has a complementary spherically convex base resting on the bearing 34. In some embodiments the bearing 34 is lubricated to allow easily sliding movement of the crushing head 24 on the bearing 34. The crushing head 24 is supported in a manner that the shaft 26 extends through a hole 35 in the bearing 34 so that the shaft 26 projects beyond the bearing 34 on an opposed side thereof to the crushing head 24. The shaft 26 is not connected to the lower bowl body but terminates within the chamber 14 so that the shaft 26, in use, is freely moveable in any direction as required to cause the sliding movement of the crushing head 24 on the bearing 34. When the crusher 10 is stopped the shaft 26 will lie substantially on its neutral axis 36.

The shaft 26 is provided with a cam 38 having a spherically domed convex surface. In the exemplary embodiment the cam 38 is integrally formed on the shaft 26 at or near its terminal end remote from the crushing head 24. In other embodiments the cam 38 can be provided on a separate D-shaped sleeve that is mounted onto the shaft 26 by suitable means to provide the spherically domed convex surface—in such case the D-shaped sleeve can be secured at any desired position along the length of the shaft 26. As shown in FIG. 2, when viewed in side view the cam 38 extends through a spherical arc α of about 90° to 100°. It will be appreciated that movement of the crushing head 24 on the bearing 34 will cause the cam 38 to move in three-dimensions within the chamber 14, the movement being confined to a spherical dome path concentrically complementary to the spherical shape of the bearing 34—i.e. the driving forces imparted to move the cam 38 laterally relative to the axis 36 will cause movement of the crushing head 24 on and within the bearing 34, but the cam 38 will also be moved axially relative to the axis 36 because the cam 38 is rigidly connected to the crushing head 24.

The frame structure 16 further supports a drive mechanism 40 for causing movement of the cone assembly 23 and accordingly of the crushing head 24. This movement can be of either an orbital or a gyratory nature but generally is an orbital movement.

The drive mechanism 40 comprises a number of drive units 42 being radially spaced around a lower part of the shaft 26. It is envisaged that the drive mechanism 40 will generally have between three and ten drive units 42, however, it may be that additional drive units need to be provided to operate very large crushers 10. In FIGS. 1 to 4 the exemplary embodiment is shown with five drive units 42 being radially spaced around the axis 36 at 72° intervals—this can be most clearly seen in FIG. 3.

Each of the drive units 42 is associated with a unique side opening 44 leading into the chamber 14 through the frame structure 16. In the exemplary embodiment, each side opening 44 opens into a passage 46 that leads into the chamber 14. Each side opening 44 is closed by a cover 48 having an outer flange 50 surrounding a convex spherical inner face, wherein the latter forms a reaction seat 52 for its drive unit 42 (shown in FIGS. 2 and 3). The cover 48 will typically be bolted to the frame structure 16, but other suitable fixation methods will be known to those skilled in the art. The drive units 42 extend between and are in abutting contact with the spherical cam 38 and with the reaction seat 52.

The drive units 42 (shown more clearly in FIGS. 5 and 6) each have a telescopic body 54 comprising two or more cylinders being in a substantially sealed sliding engagement within each other. In the exemplary embodiment, the body 54 comprises a first cylinder 56 being in sealed sliding engagement with a second cylinder 58, thereby enabling the drive units 42 to extend or retract telescopically in their longitudinal direction. The body 54 defines a continuous hollow bore 60 extending therethrough, with the opposed ends of the bore 60 being open. The bore 60 is configured to contain hydraulic fluid. A sealing ring 62 is provided between the first and second cylinders 56,58 to prevent hydraulic fluid leaking out from the bore 60 between the first and second cylinders 56,58.

On its opposed ends, each drive unit 42 has an inwardly directed first bearing support 64 provided on the first cylinder 56, being directed towards the cam 38, and an outwardly directed second bearing support 66 provided on the second cylinder 58, being directed towards its reaction seat 52. Each bearing support 64,66 is respectively joined to a seal housing 68,70 that carries an annular seal 72,74. A protruding annular collar 76 extends from the seal housing 70 joined to the second bearing support 66 (shown more clearly in FIG. 5). In the exemplary embodiment the collar 76 is integrally formed with the seal housing 70. A holder 78 (see FIGS. 1 and 2) is configured to engage over the collar 76 to maintain its seal 74 in loose contact with its reaction seat 52. The holder 78 does not restrict movement of the seal 74 on the reaction seat 52, but primarily functions during assembly to keep the drive unit 42 connected to the cap 30 so that the seal 74 remains properly aligned with the reaction seat 52 while the drive unit 42 is inserted through the side opening 44.

Figure 5:
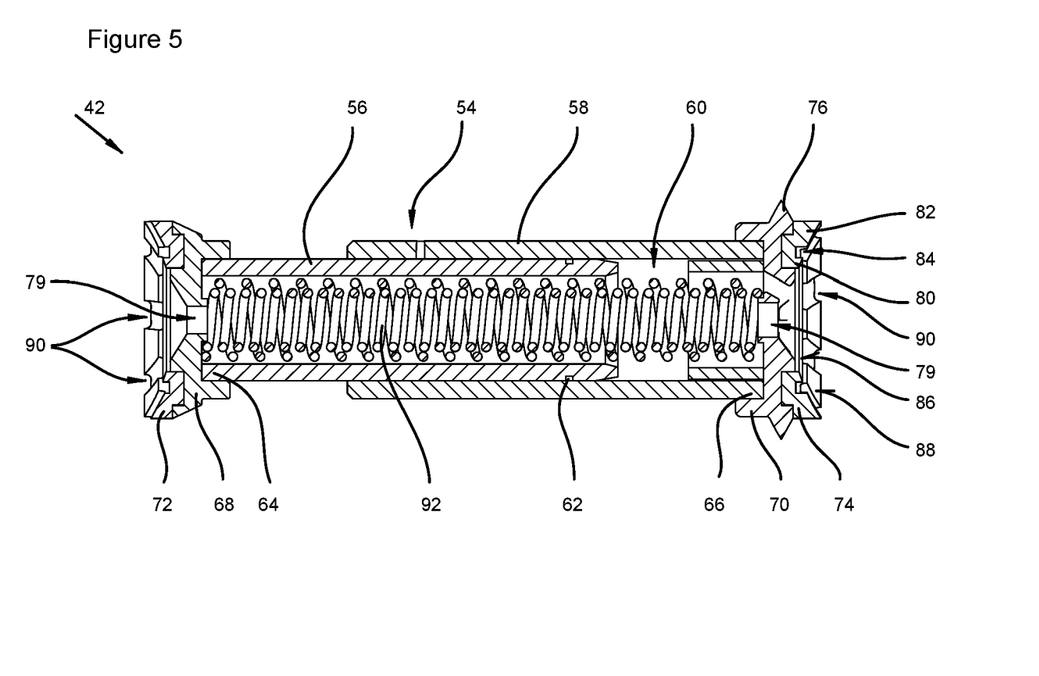
FIG. 5 is a sectional side view of one embodiment of a telescopic drive unit used in the crusher shown in FIGS. 1 to 5.
Figure 6:
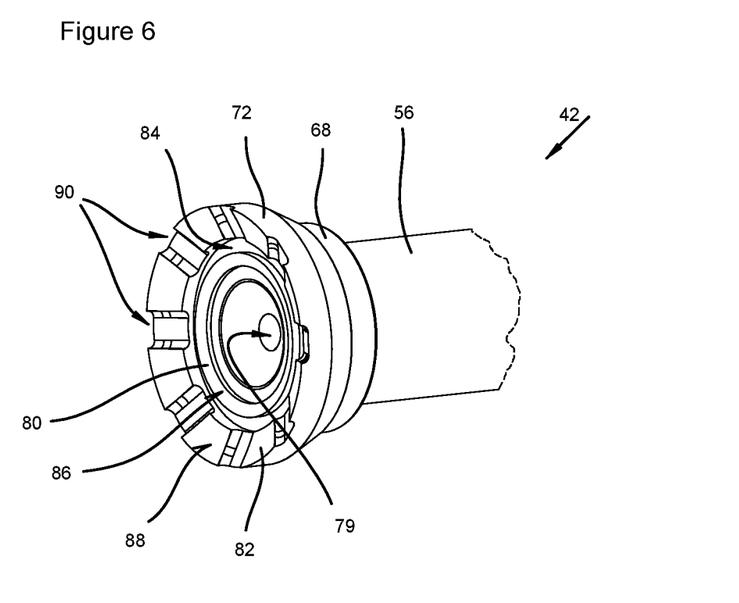
FIG. 6 is a perspective view of one end of the drive unit shown in FIG. 5.

The seals 72,74 have a central passage 79 extending therethrough so that the bore 60 of each drive unit 42 is in direct fluid communication with the spherical cam 38 and with the reaction seat 52.

Each seal 72,74 has an annular inner leg 80 and a concentric outer leg 82 that are spaced apart from each other by a groove 84. The inner and outer legs 80,82 are shaped and cooperate with each other to form outwardly directed concave faces on the opposed seals 72,74, which concave faces are respectively complementary in shape to the spherical cam 38 and the reaction seat 52 so that they can be placed into sliding abutting contact therewith.

The inner leg 80 of the seals 72,74 defines a continuous annular fluid sealing face 86 configured to form a hydraulic fluid pressure seal between its associated cylinder or bearing support 64,66 and the cam 38 or reaction seat 52 respectively. However, the inner leg 80 is configured to discharge a small portion of the hydraulic fluid from the bore 60 to thereby apply a lubricating film on the cam 38 and reaction seat 52 for assisting the smooth sliding of the seals 72,74 over the cam 38 and reaction seat 52 respectively. Typically, this discharge occurs while the seals 72,74 slide over the cam 38 and reaction seat 52 respectively. The discharge forms a residue of hydraulic fluid coating the cam 38 and reaction seat 52 and, in this manner, the drive units 42 are self-lubricating to reduce frictional contact between the seals 72,74 and the cam 38 and reaction seat 52.

The outer leg 82 of the seals 72,74 defines an annular locating face 88 configured to slidingly locate its seal 72,74 onto the cam 38 or reaction seat 52 as applicable. The outer leg 82 preferably has an outer radius being maximized to allow the seals 72,74 to cover a spherical dome of the cam 38 or reaction seat 52 being as large as possible to thereby maximize operational contact between the seals 72,74 and the cam 38 or reaction seat 52. However, the radius of the outer leg 82 of the seal 72 should be sufficiently small so that, during use, movement of the drive unit 42 does not cause the seal 72 to abut against any other drive unit's seal 72 sliding on the cam 38 or cause the seal 72 to abut against the shaft 26. Similarly, the radius of the outer leg 82 of the seal 74 should be sufficiently small so that, during use, movement of the drive unit 42 does not cause the seal 74 to abut against the flange 50 or any part of the housing 12. A skilled addressee will be able to determine the appropriate radius of the outer leg 82 for each seal 72,74. It will be appreciated that the radius of the outer legs 82 for each seal 72,74 is dependent on and must permit the drive units 42 to pass through the side openings 44 during installation and for maintenance.

The locating face 88 of the outer leg 82 of each seal 72,74 is interrupted by one or more slots 90. The slots 90 are circumferentially spaced apart and extend radially through the outer leg 82. As mentioned above, the inner leg 80 is configured to discharge a small portion of the hydraulic fluid from the bore 60 to thereby apply a lubricating film on the cam 38 and reaction seat 52. Accordingly, the pressure of the fluid within the bore 60 lifts the sealing face 86 slightly off the cam 38 or reaction seat 52 so that the fluid can flow from the bore 60 into the groove 84. The slots 90 are configured to depressurise the contact between the outer leg 82 and the cam 38 or reaction seat 52, thereby allowing the fluid to exit the groove 84 without substantially lifting the locating face 88 away from the cam 38 or reaction seat 52. For clarity, it should be appreciated that the locating face 88 may be slightly separated from the cam 38 or reaction seat 52 by the lubricating film of hydraulic fluid applied thereon, but that this slight separation is substantially less that the separation between the sealing face 86 and the cam 38 or reaction seat 52. In contrast, if the contact between the outer leg 82 and the cam 38 or reaction seat 52 was allowed to pressurise, the lifting of the locating face 88 would result in further displacing the sealing face 86 away from the cam 38 or reaction seat 52, and this could cause excessive leakage of fluid from the bore 60 and potentially failure of the drive units 42 to properly extend. The skilled addressee will appreciate that, during use, the inner leg 80 is configured to provide the fluid seal which allows the drive unit 42 to extend telescopically, whereas the outer leg 82 is configured to provide the required stability keeping the seal 72,74 in good contact with the cam 38 or reaction seat 52.

Each drive unit 42 further includes a spring 92 being configured to axially bias the first bearing support 64 apart from the second bearing support 66 and, particularly pre-use, thereby ensures the seal 72 remains in contact against the cam 38 while the seal 74 remains in contact against the reaction seat 52. In one embodiment the spring 92 is a compression coil spring. For clarity, it is emphasised that there is no mechanical connection between the cam 38 and the first bearing support 64 nor between the reaction seat 52 and the second bearing support 66. The functional contact between them is simply maintained by the biasing action of the spring 92 trapping the concave seals 72,74 between the convex cam 38 and convex reaction seat 52. During use, the fluid pressure within the bore 60 assists in maintaining the functional contact between the seals 72,74 and the cam 38 and reaction seat 52. This contact can be improved by maintaining a slight backpressure within the fluid to supplement the force exerted by the spring 92.

Due to the spherical shape of both the cam 38 and the reaction seat 52, the drive units 42 are able to move or slide in three dimensions while the shaft 26 and the cam 38 are moved about within the chamber 14 during use. It will be appreciated that the concentric nature of the cam 38 and reaction seats 52 sitting within their associated concave seals 72,74 on the bearing supports 64,66 causes the drive units 42 to extend between and remain aligned with a spherical centre of the cam 38 and with a spherical centre of the reaction seat 52.

During use the angular orientation of the drive units 42 can change as the cam 38 moves so that the pressure exerted by the drive units 42 remains orthogonal to the surface of the cam 38 and the reaction seats 52. This is advantageous because the force vector acts orthogonally directly onto the cam 38 such that there is no (or very little) loss of driving force applied by the drive units 42 as would occur in non-orthogonally aligned mechanical couplings and as are discussed in the Background.

The passages 46 diverge from their side openings 44 towards the chamber 14 to provide sufficient space for the movement of the drive units 42.

As can be seen in FIG. 2, the cam 38 is located operatively below the side openings 44, thereby resulting in the drive units 42 being angled slightly downwardly from the side openings 44 towards the cam 38 so that they are angled away from the crushing head 24. In the exemplary embodiment, when at rest, the drive units 42 are orientated at an angle of 82°-87° relative to the axis 36. In this way, activation of the drive units 42 act to seat the crushing head 24 more firmly on the bearing 34 and thereby avoid the possibility of the crushing head 24 being lifted off the bearing 34 should all the drive units 42 be activated concurrently. The downward angle of the drive units 42 also reduces the likelihood of the seal 72 disengaging and falling off the cam 38 in the unforeseen event of pressure loss in the fluid within their bores 60.

A hydraulic fluid line 94 leads from a distributor to each drive unit 42, passing through its associated cover 48, whereby hydraulic fluid can be pumped into or exhausted from the bore 60. The distributor distributes the hydraulic fluid to each of the drive units 42 in a specific order to achieve a desired movement of the shaft 26. It is envisaged that in most cases the distribution of the fluid will occur in cyclical manner whereby the fluid is pumped to each neighbouring drive unit 42 in sequence, thereby to cause orbital motion of the shaft 26 and crushing head 24. However, in some instances the distribution of the fluid can occur in crisscross or random manner whereby the fluid is not pumped to any neighbouring drive units 42. In one example the distributor includes a rotary valve (not shown) that controls flow of the hydraulic fluid through distinct discharge ports to the fluid lines 94. The rotary valve is preferably located outside the housing 12 for ease of maintenance thereof and adjustment of its operational parameters.

The distributor can be joined to a fluid reservoir to replenish any reduction of the hydraulic fluid exhausted and lost during lubrication of the cam 38 and cover 48.

Figure 7:
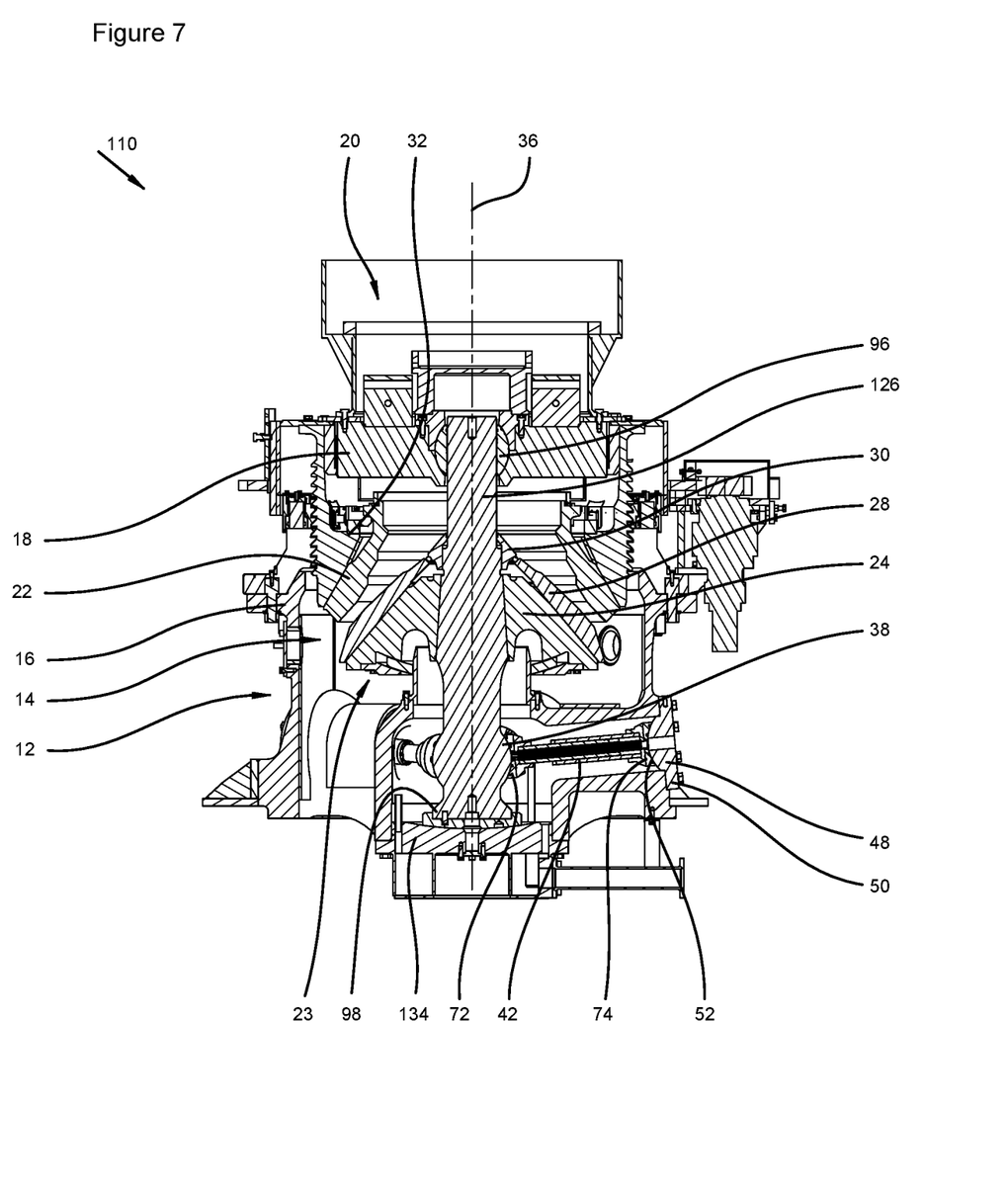
FIG. 7 is a sectional side view of a second embodiment of a cone crusher.

Referring to FIG. 7 of the drawings, there is shown a second embodiment of a cone crusher 110. The cone crusher 110 is substantially the same as the cone crusher 10 and therefore equivalent parts will be indicated using the same reference numerals.

In this embodiment the cone assembly 23 comprises a shaft 126 that extends substantially through the chamber 14. The crushing head 24 is mounted onto the shaft 126 approximately midway along the length of the shaft 126. The shaft 126 has an upper end that is pivotally located in the lid structure 118 at ball pivot 96. The shaft 126 is not fixedly joined to the ball pivot 96 but is able to slide axially through and rotate within the ball pivot 96 when the position of the lid 118 is adjusted on the housing 12. The lid 118 is a spoked structure having gaps between the spokes that define the top opening 20 through which ore can pass during use.

The shaft 126 has a lower end defining a foot 98 that is slidably supported on a bearing 134. Similar to bearing 34, also bearing 134 is spherically concave in cross-section while the foot 98 has a complementary spherically convex base resting on the bearing 134. In some embodiments the bearing 134 is lubricated to allow easily sliding movement of the foot 98 on the bearing 134.

The shaft 126 is provided with the cam 38 being located between the foot 98 and the crushing head 24, wherein the cam 38 is normally located closer to the foot 98 than to the crushing head 24. In the exemplary embodiment the cam 38 is integrally formed on the shaft 126 but in other embodiments the cam 38 can be provided on a separate D-shaped sleeve joined to the shaft 126.

The cone crusher 110 comprises the drive mechanism 40 that slidingly engages the cam 38.

In use, the drive units 42 are selectively activated to impart a drive force onto the cam 38 to cause movement of the crushing head 24.

Figure 4:
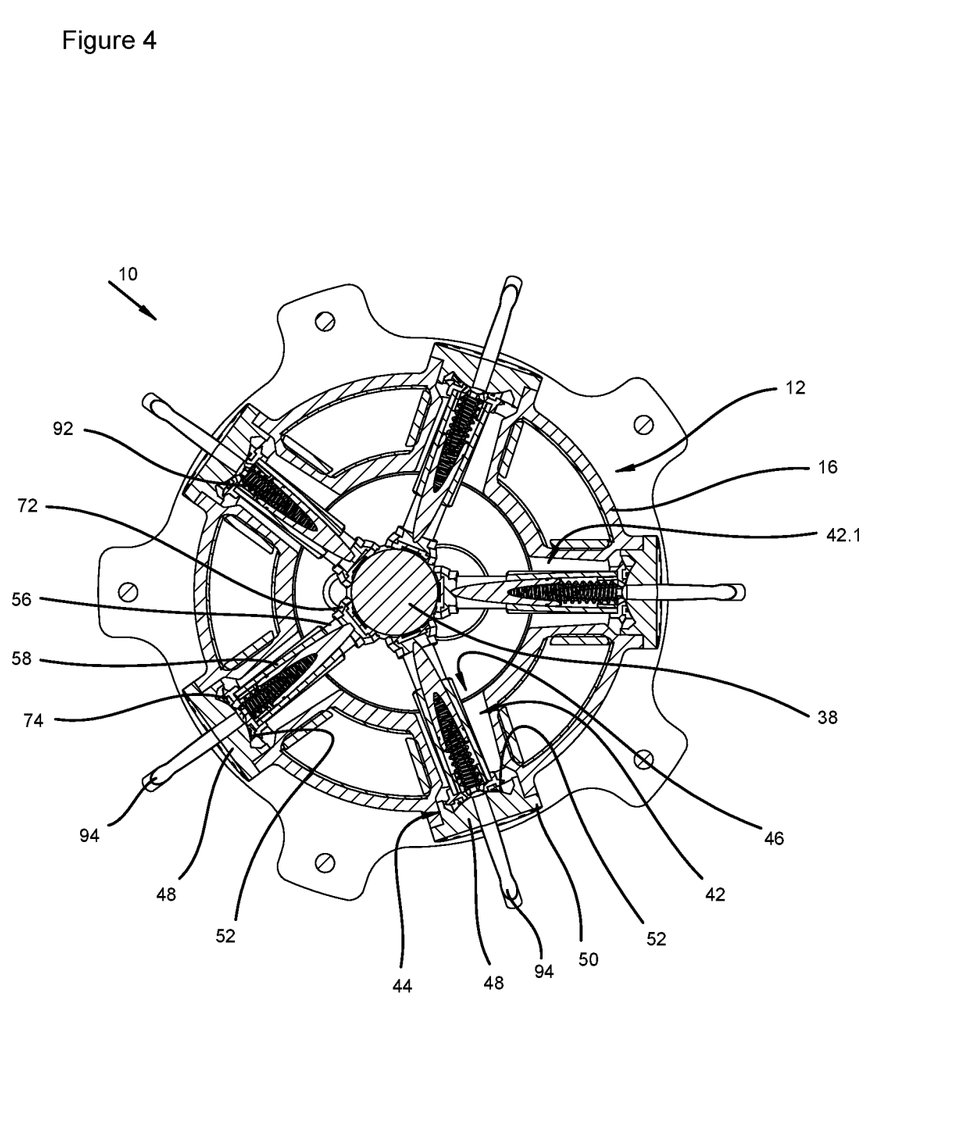
FIG. 4 is a sectional top view equivalent to that shown in FIG. 3, but with its shaft located in an offset in-use position.

For each drive unit 42, when hydraulic fluid is pumped under pressure into the bore 60, the fluid is directed by the body 54 to press outwardly in opposed directions directly onto both the cam 38 and the cover 48. Because the cover 48 is fixedly bolted to the housing 12, the fluid pushes against and moves the cam 38, and accordingly the shaft 26, away from the cover 48. While undergoing this movement, the spring 92 telescopically extends the drive unit 42 by sliding the first cylinder 56 apart from the second cylinder 58 to ensure the first bearing support 64 remains in firmly abutting contact with the cam 38 and preventing unwanted fluid leakage between the inner leg 80 of seal 72 on the first bearing support 64 and the cam 38. Such a telescopically extended drive unit is indicated in FIG. 4 by reference numeral 42.1. The other drive units 42 that are located on an opposed side of the cam 38 are telescopically retracted at the same time. As mentioned above, in addition to the spring force also the hydraulic pressure within the fluid in the bore 60 assists in telescopically extending the drive units 42 provided there is a slight resistance (backpressure) against the motion of the shaft 26.

It will be appreciated that the injection of fluid into the drive units 42 acts to provide an extending fluid column that applies the necessary movement force directly onto the cam 38 and shaft 26, 126. The cylinders 56,58 and seals 72,74 do not themselves impart any movement force to the cam 38 or shaft 26, 126; rather, the cylinders 56,58 and seals 72,74 merely function to define the bore 60 and retain the extending fluid column within the bore 60. Accordingly, there is very little frictional contact between the drive units 42 and the cam 38 and/or reaction seats 52 respectively. The main operational pressure is imparted by the extending fluid column, imposing very little fluid frictional contact onto the cam 38 and reaction seats 52, while the seals 72,74 only exert sufficient pressure onto the cam 38 and reaction seats 52 to maintain their fluid seal and seating functionality.

During operation, the drive units 42 are selectively activated and deactivated to push the shaft 26 away from its central rest position (shown in FIG. 3) and thereby cause the crushing head 24 to slide within the bearing 34 and close the crushing gap 32 between the inner crushing shell 28 and the outer crushing shell 22. In relation to the crusher 110, the drive units 42 push the shaft 126 away from its central rest position to cause the foot 98 to slide within the bearing 134 and thereby cause the crushing head 24 to close the crushing gap 32.

Because the cam 38 is spaced away from the crushing head 24, substantially by the length of the shaft 26, 126 projecting below the crushing head 24, the shaft 26 acts as a lever that amplifies the input force imparted by the drive units 42 to assist in moving the larger and heavier crushing head 24.

The step of activating each of the drive units 42 is performed by injecting hydraulic fluid into the bore 60 of each respective drive unit 42. Conversely, the step of deactivating each of the drive units 42 is performed by exhausting the fluid from the bore 60. The exhaustion can be performed by applying a vacuum/suction pressure to suck out the fluid from the bore 60 of a deactivated drive unit 42. Alternatively, the exhaustion can be achieved by permitting the expansion/extending movement of another activated drive unit 42 to compress a deactivated drive unit 42 and exhaust the hydraulic fluid from the latter's bore 60. In some instances, the exhaustion of the fluid can be achieved by both these methods. In either case, the suction and/or extension is applied with a force sufficient to overcome the bias of the spring 92 so that, while the fluid is being exhausted from the bore 60, the cylinders 56,58 can slide over each other and shorten the respective drive units 42. By exhausting the fluid from the drive units 42 over a pressure drop it is possible to ensure that the bore 60 is always filled with fluid irrespective of the length to which the drive units 42 are telescopically extended/retracted. Exhausting the fluid over the pressure drop also provides the necessary backpressure described above. Although using such a pressure drop is not essential, it does aid in operational stability of the drive mechanism 40.

In the exemplary embodiment of the crusher 10,110 that has five drive units 42, each drive unit 42 will typically be activated while the shaft 26, 126 is moving through an arc of about 150° to 160°, e.g. about 154°, on an opposed hemisphere to that of the activated drive unit 42. In some cases, each drive unit 42 may be activated while the shaft 26, 126 is moving through a reduced arc of about 120° to 140°, while in other cases each drive unit 42 may be activated while the shaft 26, 126 is moving through an enlarged arc of up to about 170° to 190°.

In use, feed ore is deposited through the top opening 20 so that it falls under gravity into the crushing gap 32 where it is crushed between the inner crushing shell 28 and the outer crushing shell 22 and disintegrates into a finer particulate product which is then withdrawn from the crusher 10, in a conventional manner known to those skilled in the art.

The crusher 10,110 enables a varying crushing pressure to be applied by the crushing head 24. This is achieved by controlling the pushing force applied by the drive units 42 to the shaft 26, 126, e.g. by changing the operating pressure of the hydraulic fluid pumped into the bores 60. The required crushing pressure may be calculated based on the material composition of the feed ore being introduced through the top opening 20. The crushing pressure may be increased for feed ore having a higher density or hardness, whereas the crushing pressure may be reduced for a feed ore having a lower density or hardness.

In a similar manner, the crusher 10,110 also enables the size of the crushing gap 32 to be adjusted by controlling the throw of the crushing head 24, i.e. the distance that the shaft 26, 126 is pushed away from the axis 36. This can be achieved by changing the volume of the hydraulic fluid pumped into the bore 60. Pumping a larger volume of fluid into the bore 60 causes the cam 38 to be moved farther and accordingly increases the angle between the shaft 26, 126 and the axis 36, thereby reducing the size of the crushing gap 32. Conversely, pumping a smaller volume of fluid into the bore 60 results in less movement of the cam 38 and accordingly decreases the angle between the shaft 26, 126 and the axis 36, thereby increasing the size of the crushing gap 32. In cases where there is a fixed volume of hydraulic fluid available for distribution through the distributor at a constant distribution pressure, the size of the throw is inversely proportional to the speed of orbital rotation of the crushing head 24. Thus the crushing head 24 will have larger throws at slower orbit speeds and will have smaller throws at faster orbit speeds.

It will be appreciated by persons skilled in the art that numerous variations and/or modifications may be made to the crusher as shown in the specific embodiments without departing from the spirit or scope of the disclosure as broadly described. The present embodiments are, therefore, to be considered in all respects as illustrative and not restrictive.

In the claims which follow and in the preceding description, except where the context requires otherwise due to express language or necessary implication, the word "comprise" or variations such as "comprises" or "comprising" is used in a non-limiting and an inclusive sense, i.e. to specify the presence of the stated features but not to preclude the presence or addition of further features in the various embodiments of the crusher. A reference to an element by the indefinite article "a" does not exclude the possibility that more than one of the elements is present, unless the context clearly requires that there be one and only one of the elements.

| Reference numerals | | | |
|---|---|---|---|
| 10, 110 | crusher | 54 | body |
| 12 | housing | 56 | first cylinder |
| 14 | chamber | 58 | second cylinder |
| 16 | frame structure | 60 | bore |
| 18, 118 | lid structure | 62 | sealing ring |
| 20 | top opening | 64 | first bearing support |
| 22 | outer crushing shell | 66 | second bearing support |
| 23 | cone assembly | 68 | seal housing |
| 24 | crushing head | 70 | seal housing |
| 26, 126 | shaft | 72 | seal |
| 28 | inner crushing shell | 74 | seal |
| 30 | cap | 76 | collar |
| 32 | crushing gap | 78 | holder |
| 34, 134 | bearing | 79 | central passage |
| 35 | hole | 80 | inner leg |
| 36 | axis | 82 | outer leg |
| 38 | cam | 84 | groove |
| 40 | drive mechanism | 86 | sealing face |
| 42 | drive unit | 88 | locating face |
| 44 | side opening | 90 | slots |
| 46 | passage | 92 | spring |
| 48 | cover | 94 | fluid line |
| 50 | flange | 96 | ball pivot |
| 52 | reaction seat | 98 | foot |

The invention claimed is:

1. A crusher for crushing material into finer particulates, the crusher comprising
   a housing supporting an outer crushing shell;
   a cone assembly located within the housing and being supported on a bearing, the cone assembly comprising
      a crushing head supporting an inner crushing shell that cooperates with the outer crushing shell to form a crushing gap therebetween; and
      a shaft joined to the crushing head, the shaft having a cam that is located remote from the crushing head; and
   a drive mechanism being configured to cause movement of the cone assembly, the drive mechanism comprising a number of drive units extending between the cam and the housing, wherein each drive unit has a first end movably abutting the cam and a second end movably abutting a discrete reaction seat provided on the housing,
   wherein, during use, the drive units are selectively activated to impart a drive force onto the cam to cause movement of the crushing head.

2. A crusher as claimed in claim 1, wherein each drive unit comprises a telescopic body having a bore extending therethrough, the bore having opposed open ends and being configured to receive and exhaust a variable volume of hydraulic fluid.

3. A crusher as claimed in claim 2, wherein the hydraulic fluid in the bore is configured to contact directly against and apply a force directly onto the cam and the reaction seat.

4. A crusher as claimed in claim 1, wherein the cam is integrally formed with the shaft.

5. A crusher as claimed in claim 1, wherein the cam has a spherically domed convex surface.

6. A crusher as claimed in claim 1, wherein the cam is configured to move in three-dimensions within the housing during use, the movement being confined to a path being concentrically complementary to a shape of the bearing.

7. A crusher as claimed in claim 1, wherein the bearing is spherically concave.

8. A crusher as claimed in claim 1, wherein the bearing slidably supports the crushing head while the shaft extends through a hole in the bearing.

9. A crusher as claimed in claim 1, wherein the bearing slidably supports a foot of the shaft.

10. A crusher as claimed in claim 1, wherein each drive unit comprises two or more cylinders being provided in a substantially sealed sliding engagement within each other.

11. A crusher as claimed in claim 10, which comprises a biasing member being configured to bias the cylinders to extend longitudinally apart from each other.

12. A crusher as claimed in claim 1, wherein neither the first end nor the second end of each drive unit is mechanically coupled to either the cam or its reaction seat.

13. A crusher as claimed in claim 1, wherein the first end of each drive unit is in sliding contact with the cam and the second end of each drive unit is in sliding contact with its associated reaction seat.

14. A crusher as claimed in claim 13, wherein each drive unit is configured to slide over the cam and its reaction seat to permit changes in the angular orientation of the drive unit within the housing so that the drive unit remains longitudinally aligned between the cam and its reaction seat.

15. A crusher as claimed in claim 13, wherein the cam has a spherical centre and each reaction seat has a spherical centre and wherein, during use, each drive unit remains longitudinally aligned between the spherical centres of the cam and its reaction seat.

16. A crusher as claimed in claim 1, wherein a seal is provided at each of the opposing first and second ends of each drive unit, each seal defining a concave outer face being configured to abut against complementary convex outer faces of the cam and the reaction seat respectively.

17. A crusher as claimed in claim 16, wherein each seal comprises an annular inner leg and a concentric outer leg that are spaced apart from each other by a groove.

18. A crusher as claimed in claim 17, wherein the inner leg defines a continuous annular fluid sealing face being configured to form a hydraulic pressure seal between the drive unit and the cam or reaction seat respectively.

19. A crusher as claimed in claim 18, wherein the seal is configured to discharge a portion of the hydraulic fluid beyond the inner leg during use to apply a lubricating film on the cam or reaction seat respectively.

20. A crusher as claimed in claim 17, wherein the outer leg defines an annular locating face being configured to slidingly locate the seal against the cam or reaction seat respectively.

21. A crusher as claimed in claim 20, wherein the locating face is interrupted by one or more slots traversing the outer leg.

22. A crusher as claimed in claim 17, wherein the outer leg has an outer radius that is maximized to allow the seals to cover an as large as possible spherical dome of the cam or reaction seat but which outer radius is sufficiently restricted to avoid contact with any other drive unit's seal.

23. A crusher as claimed in claim 1, wherein the reaction seats are located operatively above the cam so that the drive units are angled downwardly within the housing.

24. A method of operating a crusher having a housing supporting an outer crushing shell and further having a cone assembly located within the housing, the cone assembly comprising a crushing head being mounted on a shaft, the method comprising the steps of:
  providing a cam on the shaft;
  providing a drive mechanism comprising a number of drive units extending between the cam and the housing, wherein each drive unit comprises a telescopic body with a bore extending therethrough, the telescopic body having a first end abutting the cam and a second end moveably abutting a discrete reaction seat provided on the housing; and
  selectively injecting and exhausting a variable volume of hydraulic fluid into the bore of each drive unit,
  whereby, when increasing the volume of the hydraulic fluid in each bore, the hydraulic fluid imparts a drive force directly onto the cam and the reaction seat to cause movement of the crushing head.

* * * * *